(12) United States Patent
Baumann (10) Patent No.: US 6,901,851 B2
(45) Date of Patent: Jun. 7, 2005

(54) ROTATING MECHANISM FOR CONVEYOR SYSTEMS

(75) Inventor: Dieter Baumann, Waldbrunn (DE)

(73) Assignee: Maschinenfabrik Gerd Mosca AG, Waldbrunn (DE)

( * ) Notice: Subject to any disclaimer, the term of this patent is extended or adjusted under 35 U.S.C. 154(b) by 94 days.

(21) Appl. No.: 10/261,134

(22) Filed: Sep. 30, 2002

(65) Prior Publication Data

US 2003/0061945 A1 Apr. 3, 2003

(30) Foreign Application Priority Data

Oct. 2, 2001 (DE) .......................................... 101 48 698

(51) Int. Cl.⁷ .......................... B30B 13/00; B65G 47/24
(52) U.S. Cl. ............................. 100/35; 100/15; 100/18; 100/26; 198/414
(58) Field of Search ............................... 100/8, 13, 15, 100/17, 18, 26; 53/589, 590, 587, 176; 198/414, 415

(56) References Cited

U.S. PATENT DOCUMENTS

| 3,842,962 A | 10/1974 | Grachev et al. |
| 4,143,755 A | 3/1979 | Keller |
| 4,457,419 A | * 7/1984 | Ogami et al. ............ 198/345.1 |
| 4,533,033 A | 8/1985 | van Wegen |
| 4,578,933 A | * 4/1986 | Lang et al. .................... 53/589 |
| 5,111,634 A | * 5/1992 | Rauch ........................... 53/176 |
| 6,280,136 B1 | 8/2001 | Merwarth |

FOREIGN PATENT DOCUMENTS

| DE | 32 48 788 C2 | 12/1982 |
| DE | 35 13 381 A1 | 4/1985 |
| DE | 37 12 812 A1 | 4/1987 |
| DE | 42 37 526 A1 | 11/1992 |
| DE | 43 39 398 C2 | 11/1993 |
| DE | 295 06 230 U1 | 4/1995 |
| DE | 199 46 531 C2 | 9/1999 |

* cited by examiner

Primary Examiner—Allen Ostrager
Assistant Examiner—Shelley Self
(74) Attorney, Agent, or Firm—Choate, Hall & Stewart (57) ABSTRACT

A mechanism for rotating an object having a flat bottom surface on a conveyor system is described. Four circular disk segments whose rotational axes lie on a plane and are offset 90 degrees from each other are pressed against the bottom surface by a linear drive and subsequently rotated. The top surface of each disk segment lies against the bottom surface in the direction of a tangent of a circle around the rotational axis of the object. The recessed segments do not touch the bottom surface of the object. As the circular disk segments rotate, their outer circumferences rest against the bottom surface and rotate the object. This rotating mechanism is used in strapping machines and provides a method of rotation.

57 Claims, 4 Drawing Sheets

ROTATING MECHANISM FOR CONVEYOR SYSTEMS

BACKGROUND

1. Technical Field

The present invention generally relates to a drive element for an object-rotating mechanism, and in particular, to a drive element for a mechanism rotating an object on a conveyor system.

2. Description of Related Art

A mechanism described in German Patent Application 32 48 788 C2 has at least three vertically moving rollers that are rotatable around horizontal axes and jointly movable up and down, are located below the transport plane of the conveyor system in the rest position, and are lifted at least partially above the transport plane in the working position, the rollers being synchronously drivable in the working position so that the top surface of each roller moves in a direction tangent to a circle about the rotational axis of the object. In a practical embodiment, four disk-shaped rollers, each offset from each other by 90 degrees, are located as working elements in a common circle around the rotational axis. The axes of the disk-shaped rollers run parallel to the transport plane and radially relative to the rotational axis of the object. All four rollers are attached to a common supporting frame using which they may be lifted above the transport plane and lowered again below the transport plane. All four rollers are driven synchronously by drive belts.

The known mechanism is part of a strapping machine, used to wrap a strap around a package. It easily and reliably rotates the package 90 degrees between two strapping operations, so that two crossing straps may be wrapped around a package.

However, the mechanism described is quite complex, since not only the rotary drive for the disk-shaped drive elements (drive rollers), but also a lifting drive for the frame carrying these drive elements, must be provided. All drive devices are located below the strapping zone of the strapping machine. This area also contains the driving units for the strap and the sealing device, which seals the ends of the strap together after strapping. This leaves very little space for mounting the rotary drive and the lifting drive for the frame.

It may be desirable to therefore provide a rotating mechanism that has a simpler design than the known rotating mechanism.

SUMMARY OF THE INVENTION

In accordance with one aspect of the invention, a drive element for an object-rotating mechanism is located below a transport plane, is drivable to a driving motion, and has a contact surface.

In accordance with another aspect of the invention, a drive element for a mechanism rotating an object on a conveyor system includes at least one transport means whose upper surface is positioned in a transport plane and forms a supporting surface for a largely flat bottom surface of the object. The rotating mechanism includes: a rotational axis positioned at a right angle to the transport plane, at least three drive elements that are positioned around the rotational axis at an angular distance from each other and at a certain distance from this rotational axis, and the drive elements having contact surfaces that are movable from a rest position below the transport plane to a working position above the transport plane in which the drive elements rest against the bottom surface of the object and the contact surfaces are drivable about the rotational axis in a direction tangent to a circle.

In accordance with one aspect of the invention is a contact surface with at least one projecting segment and at least one recess that follow one another consecutively during the working motion of the drive element, the projecting segments of the contact surface being positioned above the transport plane and the recesses below the transport plane.

In one embodiment, due to the fact that the contact surfaces of the drive elements have consecutive raised segments and recessed segments (recesses), there is no need to lift the drive elements. The raised segments project outward from the transport plane and rest against the object to be rotated. After rotation, a raised segment is followed by a recessed segment that lies below the transport plane and does not come into contact with the bottom surface of the object.

In accordance with another aspect of the invention, the drive elements are formed by circular disk segments that are rotatably mounted. Each drive element therefore has one segment of a circular disk whose circumference emerges from the transport plane during rotation about the axis and comes to rest against the bottom surface of the object. When the free portion, in which the circular contour of the circular disk segment is interrupted, lies completely below the transport plane as the circular disk segment continues to rotate, no part of the circular disk segment extends above the transport plane with a hindering effect, making it possible to continue transporting the object without obstruction.

In accordance with one embodiment, a drive element of this type, therefore, is positioned below the transport plane of the conveyor system and is rotatable about an axis. It has a segment whose radial extension is longer than the distance between the axis and the transport plane. This first segment is followed by a second segment having a radial extension that is shorter than the distance between the axis and the transport plane. During transport of the object, the short segment of the drive element, which does not extend into the transport plane, lies on top. When the drive element rotates in the driving motion about the axis, the long segment moves above the transport plane, comes into contact with the bottom of the object to be rotated, and moves the latter in the direction of rotation. The circular segment may have a very small angular segment so that it largely forms a rod that extends at a right angle to the axis and is attached to the axis by one end. The free end of the rod then forms the projecting segment of the drive element contact surface. The free end of the rod may be provided with a friction lining.

In accordance with another aspect of the invention, the recesses in the contact surfaces of the drive elements may also have a different design. For example, the drive elements may be fully circular disks that are rotatably mounted, each having a groove for holding a drive belt on its circumference. The drive belt itself may have thicker segments having material that projects above the transport plane and thinner segments (recesses) that lie entirely below the transport plane. Other design variants of the recesses in the contact surface of the drive elements are also possible.

In accordance with one embodiment, in which a circular disk segment is used as the drive element, that is, a certain angular segment of a completely circular disk that is rotatable around its circular axis is used, the axes of all drive elements preferably run parallel to the transport plane and radially relative to the rotational axis of the rotating mechanism. This positions the planes of the circular disk segments at right angles to the transport plane. Their rotational motions at their upper vertices are thus located tangent to a circle about the rotational axis of the rotating mechanism, about which the object to be rotated should turn.

In accordance with one embodiment, four drive elements may be used, which are arranged around the rotational axis 90 degrees apart. The four drive elements provide a stable support for the rotating object.

In an embodiment, the length of the projecting segment of the contact surface of the drive element may be designed so that, when the drive element moves all the way from the position in which the recess lies directly below the object to be rotated to the next position, in which the recess lies below the object, the object to be rotated completes a single rotation about the desired angle of rotation. In the case of drive elements in the form of circular disk segments, the length of the solid arc of the circular disk segment equals the distance by which the object to be rotated is driven. This distance is derived from the product of the angle of rotation and the distance between the drive element and the object's rotational axis. If a 90 degree rotation is desired, this means multiplying the distances between the drive element and the object's rotational axis by angle value π/2, which corresponds to 90 degrees.

In one embodiment, all drive elements may be driven synchronously. In particular, the drive elements may be driven by an electric motor, using a drive belt. A toothed belt may be used as the drive belt. This ensures that the position of the different drive elements relative to each other remains the same.

In accordance with another embodiment, if multiple electric motors are used to drive the drive elements, numerically controllable motors, e.g., stepping motors, may be used which are controllable via control electronics so that all drive elements rotate the object synchronously.

In accordance with yet another aspect of the invention, the rotating mechanism may be used in connection with a strapping machine having a two-part strapping platform whose surface forms the transport plane. A gap is left between the two parts of the strapping platform through which the strap can pass.

In one embodiment, each part of the strapping platform may have at least one drive element of the rotating mechanism. In particular, two disk segment-shaped drive elements are positioned on each part of the strapping platform. The rotational axis of the object to be rotated therefore lies in the center of the gap between the two parts of the strapping platform.

In accordance with an embodiment of the strapping machine, the gap in the strapping platform is situated transversely relative to the object transport direction. Motor-driven drive rollers are situated parallel to the gap at the outer edges of the two parts of the strapping platform. Deflection rollers are supported on the inner edges adjacent to the gap. At least one conveyor belt is stretched around a drive roller and a deflection roller. The conveyor belt runs next to the drive elements and forms the means for transporting the object to be strapped on the strapping platform and for removing the completely strapped object. Two or three conveyor belts are preferably located on each part of the strapping table, with the drive elements positioned between them.

In accordance with yet another aspect of the invention is a method for rotating an object on a conveyor system, in which the object having a largely flat bottom surface is placed on a transport means whose top surface forms a transport plane. The object is transported by the transport means to a rotating mechanism having drive elements. The drive elements are motor-driven to rotate the object, outer contact surfaces of the drive elements moving the object about a rotational axis in a rotational motion.

In accordance with one aspect of the invention, recesses in the contact surfaces lie below the object and do not project above the transport plane before the drive elements are driven, while projecting segments of the contact surfaces following the recesses move below the object while the drive elements are being driven, project above the transport plane, and transmit the rotational motion to the object. This eliminates the need to lift the drive elements to execute the rotational motion.

According to an embodiment of the method, a strap is applied to the object before the drive elements of the rotating mechanism are driven, and another strap is applied after the object has rotated 90 degrees, so that the straps around the object cross each other.

In accordance with another aspect of the invention is a method for rotating an object using drive elements. An object is placed on a transport plane. Each of the drive elements has a contact surface with a recessed part and being in a first position such that no section of the drive elements projects above the transport plane. The drive elements are driven causing projection of a projecting portion of contact surfaces of each of the drive elements from below the transport plane to above said transport plane transmitting rotational motion to the object rotating the object about a rotational axis.

In accordance with yet another aspect of the invention is an apparatus for rotating an object comprising drive elements. Each of the drive elements has a contact surface with a recessed part such that when each of the drive elements is in a first position, no section of the drive elements projects above a transport plane on which the object rests. Contact surfaces of each of the drive elements include a projecting portion which projects from below said transport plane to above said transport plane transmitting rotational motion to the object rotating the object about a rotational axis when said drive elements are being driven.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF PREFERRED EMBODIMENT(S)

FIGS. 1 through 4 show a strapping platform 1 that includes two parts 2, 3. A gap 4 is provided between parts 2, 3 to allow the passage of a strap 27.

Both parts 2, 3 of strapping platform 1 are provided with transport means that enable an object to be transported in a direction at a right angle to gap 4. The transport means are formed by conveyor belts 5. Three parallel conveyor belts 5 are arranged side by side on each part 2, 3 of strapping platform 1. Conveyor belts 5 are driven by drive rollers 9, 10, which are provided at the outer edges of parts 2, 3 of transport platform 1 and extend parallel to gap 4. Each of drive rollers 9, 10 is driven by a d.c. motor 11, 12. A shared motor controller ensures that drive motors 11, 12 rotate synchronously and at the same speed. Deflection rollers are situated at the inner edges of parts 2, 3 of transport platform 1, adjacent to gap 4. Each conveyor belt 5 passes around one of drive rollers 9, 10 and one of deflection rollers 13, conveyor belts 5 being elastically tensioned to increase the friction between conveyor belts 5 and the surface of drive rollers 9, 10.

For design reasons, the gap is several centimeters wide. If conveyor belts 5 are used to transport large objects having rigid and smooth bottom surfaces on strapping platform 1, gap 4 may remain open over its entire width. However, if smaller objects or objects having a flexible bottom surface, such as newspaper stacks, are transported, a cover strip 6 is screwed onto part 2 of strapping table 1, as shown in FIGS. 1 through 4, extending over the edge of part 2 adjacent to gap 4 and reducing gap 4 to a width of a few millimeters. This prevents areas of the bottom surface of the transported object from getting caught in gap 4 during transport. Cover strip 6 is fastened by simple fastening screws 7 and has recesses 8 that allow the passage of conveyor belts 5.

Each part 2 and 3 of strapping platform 1 has a pair of slots 14 between the two outer conveyor belts 5. Slots 14 each extend to conveyor belts 5 at a 45 degree angle and are oriented tangent to an imaginary circle around rotational axis 15, which is oriented at a right angle to the surface of strapping platform 1 and passes through the center of gap 4. Center conveyor belt 5 extends between the two slots 14 of part 2 and part 3. Below each of slots 14 is a drive element 16, which is designed as a circular disk segment. The radius of circular disk segment 16 is greater than the distance between its arbor 17 and the supporting surface of conveyor belt 5, i.e., the transport plane, so that the outer circumferential surface of circular disk segment 16 extends above this supporting surface and presses against an object located thereon when the drive element rotates about its arbor 17.

Figure 7:
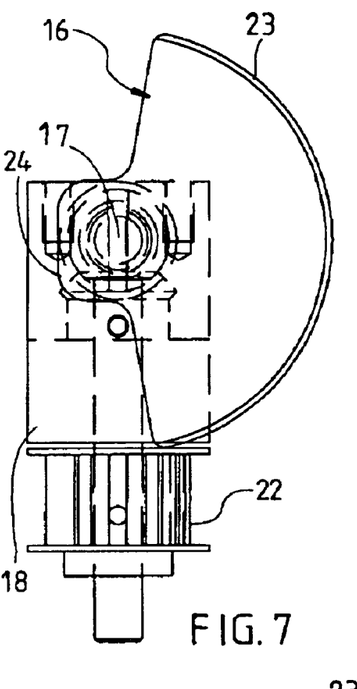
FIG. 7 shows a front view of a drive element of the strapping platform illustrated in the preceding figures.
Figure 8:
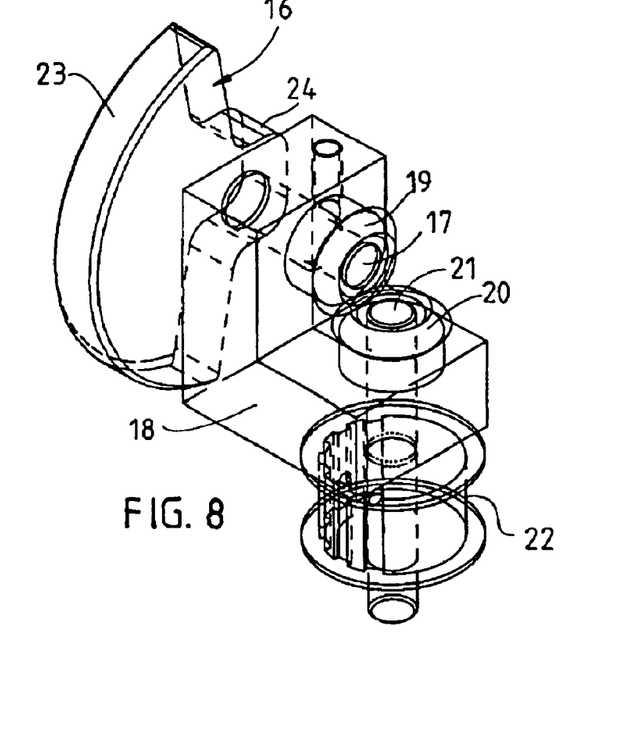
FIG. 8 shows a schematic rear view of the drive element from FIG. 7.

FIGS. 7 and 8 show the details of circular disk segments 16 and the drive mechanism for circular disk segments 16. Each circular disk segment 16 is non-rotatably positioned on a motor-driven arbor 17. Arbor 17 is rotatably mounted on a bearing pad 18 and passes through this bearing pad. A conical toothed wheel 19 is attached to arbor 17 on the side of bearing pad 18 facing away from the circular disk segment. This conical toothed wheel 19 engages with a corresponding conical toothed wheel 20, which is located in a second leg of bearing pad 18 and is positioned on a shaft 21 that also holds a toothed belt disk 22. A toothed belt (not illustrated) is used to rotate the toothed belt disk, causing the conical toothed gear to rotate circular disk segment 16.

A friction lining 23 is provided on the circular circumferential surface of the solid section of circular disk segment 16. Friction lining 23 forms the contact surface for the object to be rotated.

A drive element of this type in the form of a circular disk segment 16 is mounted below each slot 14 in parts 2, 3 of transport platform 1. The central plane of circular disk segment 16 thus runs flush against the central plane of slot 14 so that the outer area of circular disk segment 16 is able to pass through slot 14. Slot 14 is longer than the secant of the section of circular disk segment 16 passing through the slot and projecting above strapping platform 1. The drive controller of circular disk segments 16 is set so that circular disk segments 16 project downward in the idle position, and hub segment 24 (see FIG. 7) formed on circular disk segment 16 points upward.

The two circular disk segments 16, one on each part 2 and 3 of strapping platform 1, are driven by a common drive motor 25 (see FIG. 6), using a toothed belt 26. Toothed belt 26 ensures that the two circular disk segments 16 move synchronously with each other.

Second drive motor 25 on second part 2 or 3 of strapping platform 1 is synchronized with drive motor 25 on the opposite part of strapping platform 1 by control electronics.

Figure 1:
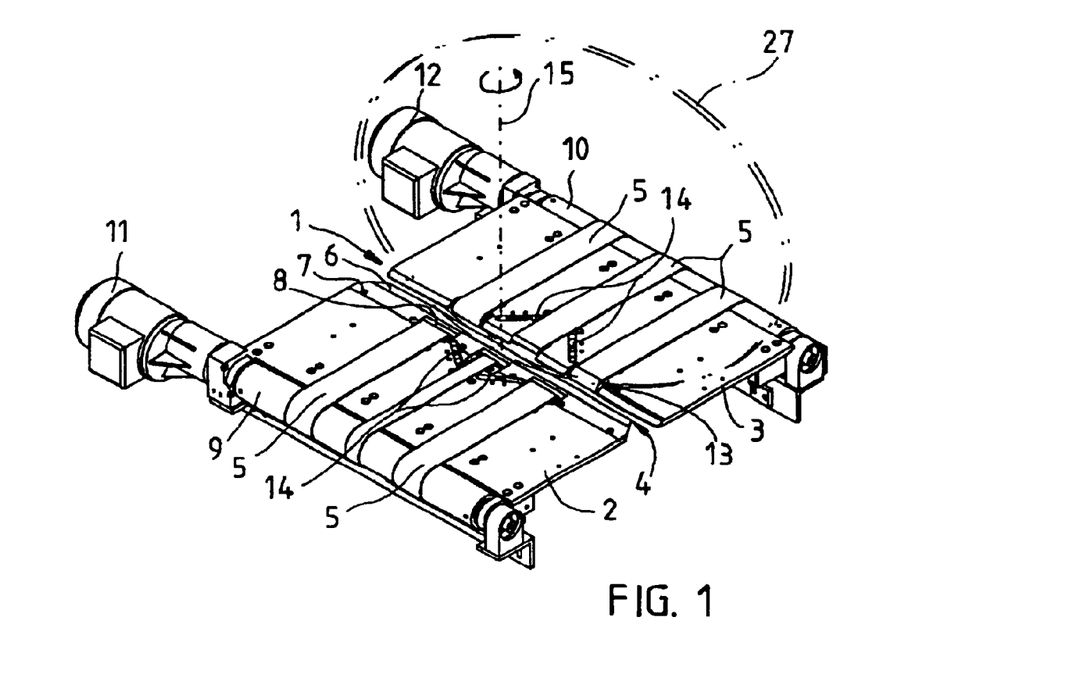
FIGS. 1–4 show a schematic top view of a strapping platform that includes a rotating mechanism according to the present invention, the drive elements being shown in four different positions.

FIGS. 1 through 4 show the sequence of motions of disk segment-shaped drive elements 16 while an object lying on strapping platform 1 is being rotated. FIG. 1 shows the circular disk segments in the rest position, where no section of the circular disk segments projects above the surface of strapping platform 1. Drive rollers 9, 10, which are used to set conveyor belts 5 in motion, may be actuated in this position. An object is freely transportable on strapping platform 1 or may be conveyed away from the latter. The planes of conveyor belts 5, which largely correspond to the top surface of strapping platform 1, form the transport plane on which the largely smooth bottom surface of the object may be placed.

The rotating mechanism in this embodiment is activated when conveyor belts 5 are stationary. Drive motors 25 (FIG. 6) drive disk segment-shaped drive elements 16 synchronously via the toothed belts. In the direction of the driving motion the recessed part of each drive element 16, i.e., the cutaway part of each disk segment, which is positioned upward in the idle position is followed by the solid portion which forms the projecting section of each drive element 16.

Figure 2:
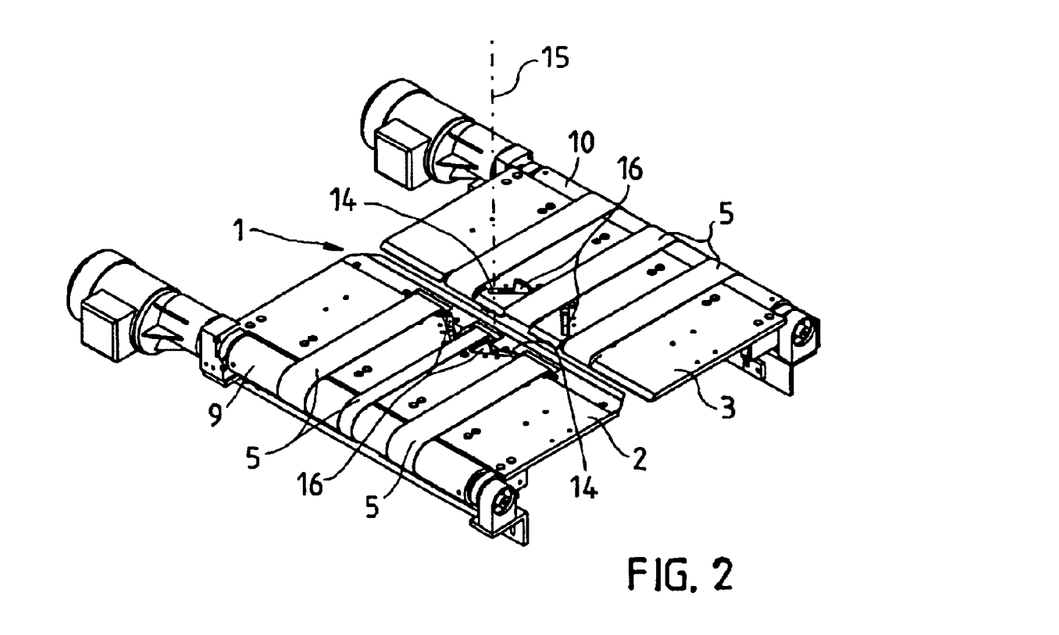
Figure 3:
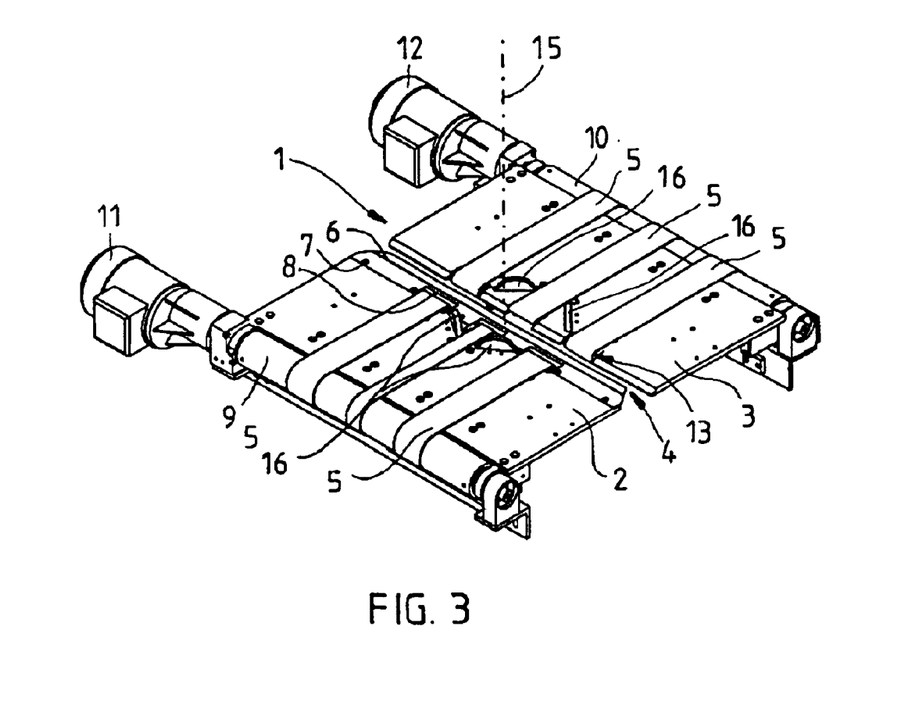
Figure 4:
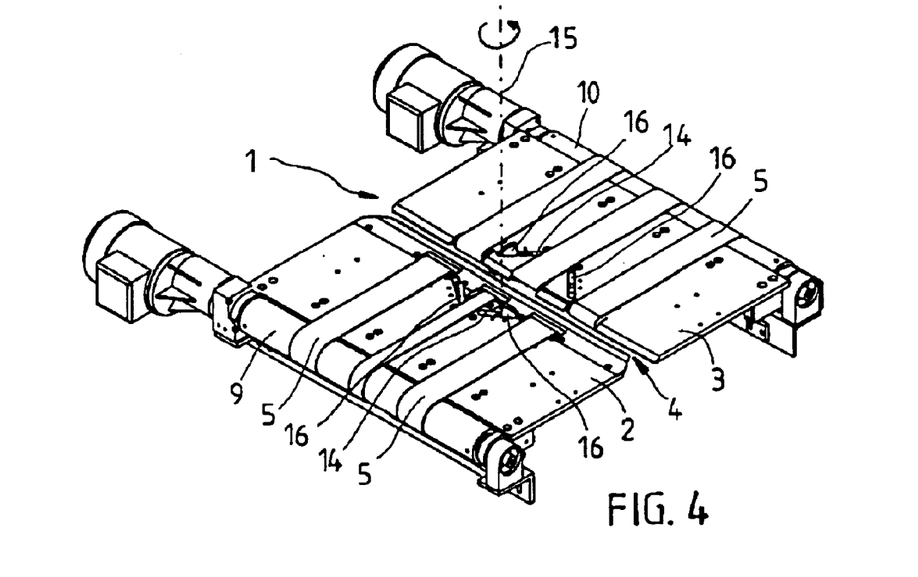
Figure 5:
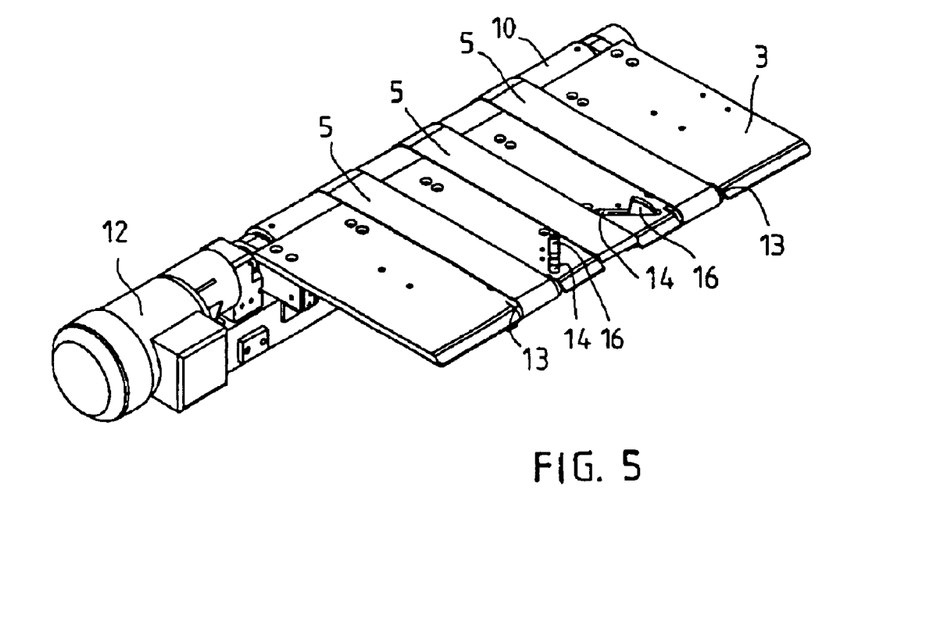
FIG. 5 shows a schematic top view of one part of the strapping platform from the preceding FIGS. 1–4.

FIG. 2 shows the position of circular disk segments 16 after a 90 degree rotation. FIG. 3 shows the rotating mechanism after all four circular disk segments have rotated another 90 degrees, the solid area of circular disk segments 16 projecting almost completely through slot 14. FIG. 4 shows another view of disk segment-shaped drive elements 16 after another 90 degree rotation. As drive elements 16 continue to rotate, the contact surfaces of all drive elements 16 drop below the platform plane, the object to be rotated being lowered after the preset rotation has been executed.

Note that contact surfaces 23 of disk segment-shaped drive elements 16 projecting above the transport plane through slot 14 move tangent to a circle around rotational axis 15 of the rotating mechanism of this embodiment. The rotating object executes a 90 degree rotation about rotational axis 15 in a counter-clockwise direction. Circular disk segments 16 may, of course, also be driven to rotate in the opposite direction, so that the object to be rotated turns about rotational axis 15 in a clockwise direction. The length of the circumference of circular disk segments 16 equals the length of a 90 degree arc segment around rotational axis 15, whose radius equals the distance between drive elements 16 and rotational axis 15.

Figure 6:
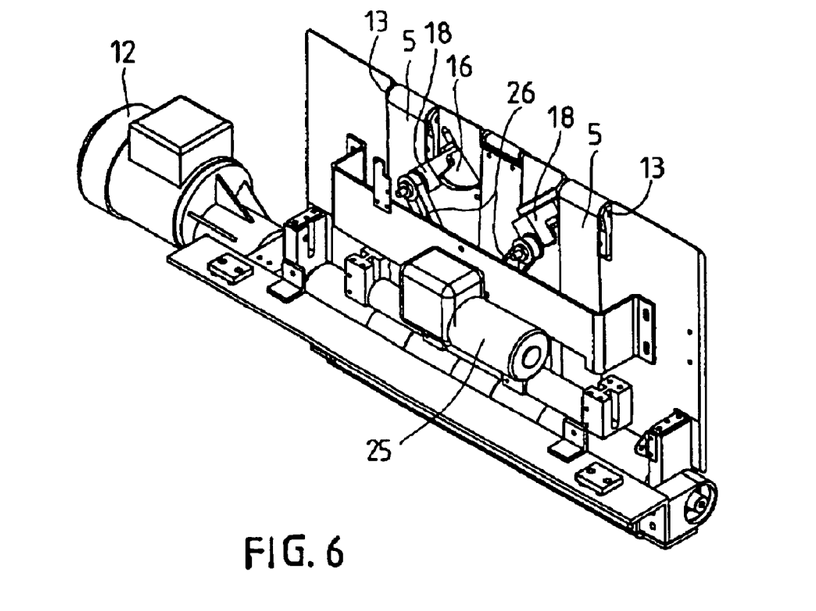
FIG. 6 shows a schematic bottom view of the part of the strapping platform from FIG. 5.

As shown in FIG. 6, drive motors 12 for drive roller 10, which drives conveyor belts 5, as well as drive motor 25 for driving disk segment-shaped drive elements 16 are located close to the outer edges of strapping platform 1 and at a distance from its gap 4. These units are therefore provided in a different area than the belt guiding frame of the strapping machine as well as the sealing and welding mechanism for welding the ends of the straps of the strapping machine. The rotating units and the strapping and sealing units therefore do not interfere with each other.

If the objects to be strapped have largely flat, rigid bottom surfaces, two conveyor belts 5 may be sufficient to reliably transport the object. In this case, middle conveyor belt 5 may be omitted between the two slots 14 of each platform part 2, 3. If the objects to be strapped are flexible (e.g., newspaper stacks), the arrangement shown in the drawings, having middle conveyor belt 5 between the two slots 14, allowing drive elements 16 to pass through, is useful to support the middle of the object during transport.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A conveyor system for transporting objects to be strapped on a strapping machine, the conveyor system comprising:
    at least one transport means having a top surface situated in a transport plane, wherein said top surface forms a supporting surface for a largely flat bottom surface of the object; and
    a rotating mechanism having a rotational axis oriented at a right angle to the transport plane, and comprising at least three drive elements that are arranged at angular distances from each other around the rotational axis and at a distance from the rotational axis, each drive element having a contact surface with at least one projecting segment and at least one recess that follow one another consecutively when the drive element is being driven, wherein the at least one projecting segment projects above the transport plane during driving motion and rests against the bottom surface of the object, and wherein a length of the at least one projecting segment equals a length of an arc around the rotational axis resulting when the object rotates around a preset angle of rotation.

2. The conveyor system as recited in claim 1, wherein each drive element comprises: a rotatable circular disk having a retaining groove for a drive belt on a circumference of the circular disk, the drive belt having consecutive projecting segments and recesses forming the contact surface.

3. The conveyor system of claim 1, wherein each drive element comprises a rotatable circular disk segment.

4. The conveyor system of claim 3, wherein a rotational axis of each drive element is parallel to the transport plane.

5. The conveyor system as recited in claim 3, wherein a rotational axis of each drive element extends radially relative to a rotational axis of the rotating mechanism, about which the object turns.

6. The conveyor system of claim 1, wherein contact surfaces of the drive elements are drivable to perform a working motion in a direction tangent to a circle around the rotational axis.

7. The conveyor system of claim 6, wherein four circular disk segments are positioned as drive elements at a 90 degree angle from each other around the rotational axis.

8. The conveyor system of claim 7, wherein all drive elements are driven synchronously.

9. The conveyor system of claim 8, wherein the drive elements are driven by an electric motor using a drive belt.

10. The conveyor system of claim 9, wherein the drive belt is a toothed belt.

11. The conveyor system of claim 1, further comprising: a two-part strapping platform, wherein each part of the strapping platform includes at least one of said drive elements, and wherein a gap is provided between the two parts of the strapping platform allowing for passage of strap.

12. The conveyor system of claim 11, wherein the gap is oriented transversely relative to an object transport direction.

13. A conveyor system for transporting objects to be strapped on a strapping machine, the conveyor system comprising:
    at least one transport means having a top surface situated in a transport plane, wherein said top surface forms a supporting surface for a largely flat bottom surface of the object;
    a rotating mechanism having a rotational axis oriented at a right angle to the transport plane, and comprising at least three drive elements that are arranged at angular distances from each other around the rotational axis and at a distance from the rotational axis, wherein projecting segments of contact surfaces of the drive elements projecting projects above the transport plane during driving motion and rest against the bottom surface of the object; and
    a two-part strapping platform, wherein each part of the strapping platform includes at least one of said drive elements, and wherein a gap is provided between the two parts of the strapping platform allowing for passage of a strap, wherein the gap is oriented transversely relative to an object transport direction, and
    wherein each part of the strapping platform includes:
    at least one drive roller at an outer edge of the strapping platform parallel to the gap;
    at least one deflection roller at an inner edge of the strapping platform adjacent to the gap; and
    at least one conveyor belt which passes around the drive roller and the deflection roller, which constitutes the transport means and which extends adjacent to the drive elements.

14. A method for rotating an object on a conveyor system of a strapping machine, comprising:
    placing the object having a largely flat bottom surface on a transport means whose upper surface forms a transport plane;
    transporting the object by the transport means to a rotating mechanism which has drive elements; and
    rotating the object using the drive elements, said drive elements being motor-driven, wherein outer contact surfaces of the drive elements rotate the object about a rotational axis, and wherein recesses of the contact surfaces lie below the object and do not project above the transport plane before the drive elements are driven; and
    projecting segments of the contact surfaces that follow the recesses move below the object and project above the transport plane, transmitting rotational motion to the object when the drive elements are being driven.

15. The method of claim 14, further comprising:
    applying a strap to the object before the drive elements are driven;
    rotating the object 90 degrees using the drive elements; and
    applying a second strap to the object.

16. A method for rotating an object on a conveyor system of a strapping machine, comprising:

placing an object on a transport plane;

providing a plurality of drive elements in a first position such that no section of the drive elements projects above the transport plane, each of said drive elements having a contact surface with a recessed part; and causing a projecting portion of said contact surface of each of said drive elements from below said transport plane to rise above said transport plane to rotate the object.

17. The method of claim 16, wherein said projecting portion of each drive element follows said recess portion of each drive element.

18. The method of claim 16, further comprising:

placing the object on a transport means whose upper surface forms a part of said transport plane; and transporting the object by the transport means to a rotating mechanism which includes said drive elements.

19. The method of claim 18, further comprising:

activating said rotating mechanism when said transport means is stationary and said recessed portions of said drive elements are positioned upward and idle.

20. The method of claim 19, wherein said rotating mechanism rotates said object in one of a clockwise and counterclockwise direction.

21. The method of claim 19, further comprising:

moving contact surfaces of said drive elements projecting above the transport plane tangent to a circle around a rotational axis about which the object turns.

22. The method of claim 16, wherein said drive elements are motor-driven.

23. The method of claim 17, wherein said drive elements are circular disk segments.

24. The method of claim 23, wherein each circular disk segment is non-rotatably positioned on an arbor, said arbor being mounted on a bearing pad and passing through said bearing pad.

25. The method of claim 24, wherein, for each circular disk segment, a conical toothed wheel is attached to the arbor on a side of the bearing pad facing away from said each circular disk segment.

26. The method of claim 25, wherein said conical toothed wheel is on a side of said bearing pad included in a first portion of said bearing pad, and the method further comprising, for each circular disk segment:

engaging, by said conical toothed wheel, a corresponding conical toothed wheel that is located in another portion of said bearing pad and is positioned on a shaft holding a toothed belt disk; and rotating said toothed belt disk using a motor causing rotation of said each circular disk segment.

27. The method of claim 16, wherein a friction lining forms an outer surface of each of said projecting portions.

28. The method of claim 16, further comprising:

projecting said projecting portions of each drive element through a slot in said transport plane.

29. The method of claim 16, wherein said first position is a rest position, and the method further comprises:

applying a strap to the object when in said rest position;

rotating the object; and applying a second strap to the object.

30. The method of claim 18, wherein said transport means includes a plurality of conveyor belts.

31. The method of claim 30, wherein said transport means includes at least three conveyor belts arranged parallel to one another and the method further comprising:

selectively disabling operation of at least one inner conveyor belt allowing operation of other conveyor belts in accordance with rigidity of the object being transported.

32. The method of claim 31, further comprising:

positioning four circular disk elements as drive elements at a 90 degree angle from each other around a rotational axis about which the object turns;

attaching a platform to said transport means;

making a slot located in a platform between conveyor belts for each of said circular disk elements through which said projection portion of said each circular disk element projects.

33. The method of claim 32, wherein said platform is a two-part platform having a gap between each of said two parts.

34. The method of claim 33, wherein each of said two parts includes at least one drive element.

35. The method of claim 33, further comprising:

attaching a cover strip to one part of said platform extending over an inner edge of the platform adjacent to said gap and reducing a width of said gap.

36. A strapping machine including an apparatus for rotating an object, the apparatus comprising:

drive elements;

a contact surface provided on each of the drive elements having at least one recessed part, each of said drive elements being in a first position with no section of the drive elements projecting above a transport plane on which the object rests; and said contact surface of each of said drive elements including at least one projecting portion which projects from below said transport plane to above said transport plane to rotate the object.

37. The strapping machine of claim 36, wherein said projecting portion of each drive element follows a recess portion of each drive element.

38. The strapping machine of claim 36, further comprising:

transport means whose upper surface forms said transport plane, said transport means transporting the object to a rotating mechanism which includes said drive elements.

39. The strapping machine of claim 36, wherein said drive elements are motor-driven.

40. The strapping machine of claim 37, wherein said drive elements are circular disk segments.

41. The strapping machine of claim 40, wherein each circular disk segment is non-rotatably positioned on an arbor, said arbor being mounted on a bearing pad and passing through said bearing pad.

42. The strapping machine of claim 41, wherein, for each circular disk segment, a conical toothed wheel is attached to the arbor on a side of the bearing pad facing away from said each circular disk segment.

43. The strapping machine of claim 42, wherein said conical toothed wheel is a first conical toothed wheel on a side of said bearing pad included in a first portion of said bearing pad, and the apparatus further comprising, for each circular disk segment:

a second conical toothed wheel engaged by said first conical toothed wheel, said second conical toothed wheel being located in another portion of said bearing pad and being positioned on a shaft holding a toothed belt disk; and means for rotating said toothed belt disk causing rotation of said each circular disk segment.

44. The strapping machine of claim 36, wherein a friction lining forms an outer surface of each of said projecting portions.

45. The strapping machine of claim 36, further comprising:
   means for projecting said projecting portions of each drive element through a slot in said transport plane.

46. The strapping machine of claim 38, wherein said transport means includes a plurality of conveyor belts.

47. The strapping machine of claim 46, wherein said transport means includes at least three conveyor belts arranged parallel to one another and the apparatus further comprising:
   means for selectively disabling operation of at least one inner conveyor belt allowing operation of other conveyor belts in accordance with rigidity of the object being transported.

48. The strapping machine of claim 47, further comprising:
   four circular disk elements positioned as drive elements at a 90 degree angle from each other around a rotational axis about which the object turns;
   a platform coupled to said transport means, wherein a slot is located in said platform between conveyor belts for each of said circular disk elements through which said projection portion of said each circular disk element projects.

49. The strapping machine of claim 48, further comprising a two-part platform having a gap between each of said two parts.

50. The strapping machine of claim 49, wherein each of said two parts includes at least one drive element.

51. The strapping machine of claim 49, further comprising:
   a cover strip coupled to one part of said platform extending over an edge adjacent to said gap and reducing a width of said gap.

52. The strapping machine of claim 48, further comprising:
   two motors for driving said plurality of conveyor belts and two other motors for driving said circular disk elements, said motors being located near outer edges of said platform.

53. The strapping machine of claim 38, further comprising:
   means for activating said rotating mechanism when said transport means is stationary and said recessed portions of said drive elements are positioned upward and idle.

54. The strapping machine of claim 53, further comprising:
   means for moving contact surfaces of said drive elements projecting above the transport plane tangent to a circle around a rotational axis about which the object turns.

55. A strapping machine, comprising:
   a drive element for an object rotating mechanism in which the drive element is positioned below a transport plane, drivable to perform a driving motion, has a contact surface, and rotates an object around a rotational axis, wherein the contact surface has at least one projecting segment and at least one recess that follow one another consecutively when the drive element is being driven, the projecting segments of the contact surface lying above the transport plane and the recesses lying below the transport plane, and wherein a length of a projecting segment equals a length of an arc around the rotational axis resulting when the object rotates around a preset angle of rotation.

56. A strapping machine, comprising:
   a mechanism for transporting and rotating an object, the mechanism including:
      at least one transport means whose top surface is situated in a transport plane and forms a supporting surface for a largely flat bottom surface of the object; and
      at least three drive elements that are arranged at angular distances from each other around a rotational axis oriented at a right angle to the transport plane and at a distance from the rotational axis, wherein projecting segments of contact surfaces of the drive elements project above the transport plane during driving motion and rest against the bottom surface of the object, and wherein a length of a projecting segment equals a length of an arc around the rotational axis resulting when the object rotates around a preset angle of rotation.

57. A method for rotating an object on a conveyor system of a strapping machine, comprising:
   placing the object having a largely flat bottom surface on a transport means whose upper surface forms a transport plane;
   transporting the object by the transport means to a rotating mechanism which has drive elements;
   rotating the object using the drive elements, said drive elements being motor-driven, wherein outer contact surfaces of the drive elements rotating the object about a rotational axis, and wherein recesses of the contact surfaces lie below the object and do not project above the transport plane before the drive elements are driven; and
   projecting segments of the contact surfaces that follow the recesses move below the object and project above the transport plane, transmitting rotational motion to the object when the drive elements are being driven, wherein a length of a projecting segment equals a length of an arc around the rotational axis resulting when the object rotates around a preset angle of rotation.

* * * * *